United States Patent [19]

Schaefer et al.

[11] Patent Number: 6,070,934
[45] Date of Patent: Jun. 6, 2000

[54] FOLDING SEAT MOUNTING APPARATUS

[75] Inventors: Donald Richard Schaefer, Waterford; Frank Qiukui Liu, Canton; Majid Hammoud, Plymouth, all of Mich.

[73] Assignee: Ford Motor Company, Dearborn, Mich.

[21] Appl. No.: 09/241,880

[22] Filed: Feb. 1, 1999

[51] Int. Cl.$^7$ ....................................................... B60N 2/32
[52] U.S. Cl. .................... 297/14; 297/378.12; 296/65.09
[58] Field of Search .......................... 297/378.13, 378.12, 297/322, 341, 15, 14; 296/65.09, 65.05, 65.16

[56] References Cited

U.S. PATENT DOCUMENTS

| | | | |
|---|---|---|---|
| 3,114,574 | 12/1963 | Pryale | 297/378.12 X |
| 4,627,656 | 12/1986 | Gokimoto et al. | 297/378.13 X |
| 4,736,985 | 4/1988 | Fourrey et al. | |
| 5,195,795 | 3/1993 | Cannera et al. | 297/15 X |
| 5,393,116 | 2/1995 | Bolsworth et al. | |
| 5,482,349 | 1/1996 | Richter et al. | |
| 5,570,931 | 11/1996 | Kargilis et al. | |
| 5,588,707 | 12/1996 | Bolsworth et al. | 297/378.12 |
| 5,934,732 | 8/1999 | Jakubiec | 296/65.09 X |

FOREIGN PATENT DOCUMENTS 2251183  7/1992  United Kingdom .............. 297/378.13

*Primary Examiner*—Peter M. Cuomo
*Assistant Examiner*—Stephen Vu
*Attorney, Agent, or Firm*—Gregory P. Brown; Roger L. May

[57] ABSTRACT

A seat mounting apparatus for supporting a seat on a floor of a motor vehicle and for allowing the seat to be positioned from an upright seating position to a folded position. The seat mounting apparatus includes a seat back frame (24) having an upper end (27) and a lower end (28) pivotally attached to the floor; a seat bottom frame (34) having a forward end (35) and a rearward end (36) disposed adjacent to the seat back frame when the seat is in the upright seating position; a leg (44) having a first end (46) pivotally connected to the seat bottom frame and a second end (48) pivotally connected to the floor; a slotted link (50) having a third end (52) pivotally connected to the floor and a slot (54) extending from a position substantially adjacent to the third end to a fourth end (56) opposite the third end, the slot being slidably engaged with a slider pin (57) disposed on the seat back frame; and a rear link (58) having a fifth end (62) rigidly attached to the seat bottom frame and a sixth end (68) pivotally attached to an intermediate pivot point (64) on the slotted link, the intermediate pivot point being disposed intermediate of the third and fourth ends of the slotted link. Upon movement of the seat back frame from the upright position to the folded position, the slotted link together with the rear link position the seat bottom frame forward and downward such that the seat back frame lies substantially flat and parallel to the floor.

10 Claims, 3 Drawing Sheets

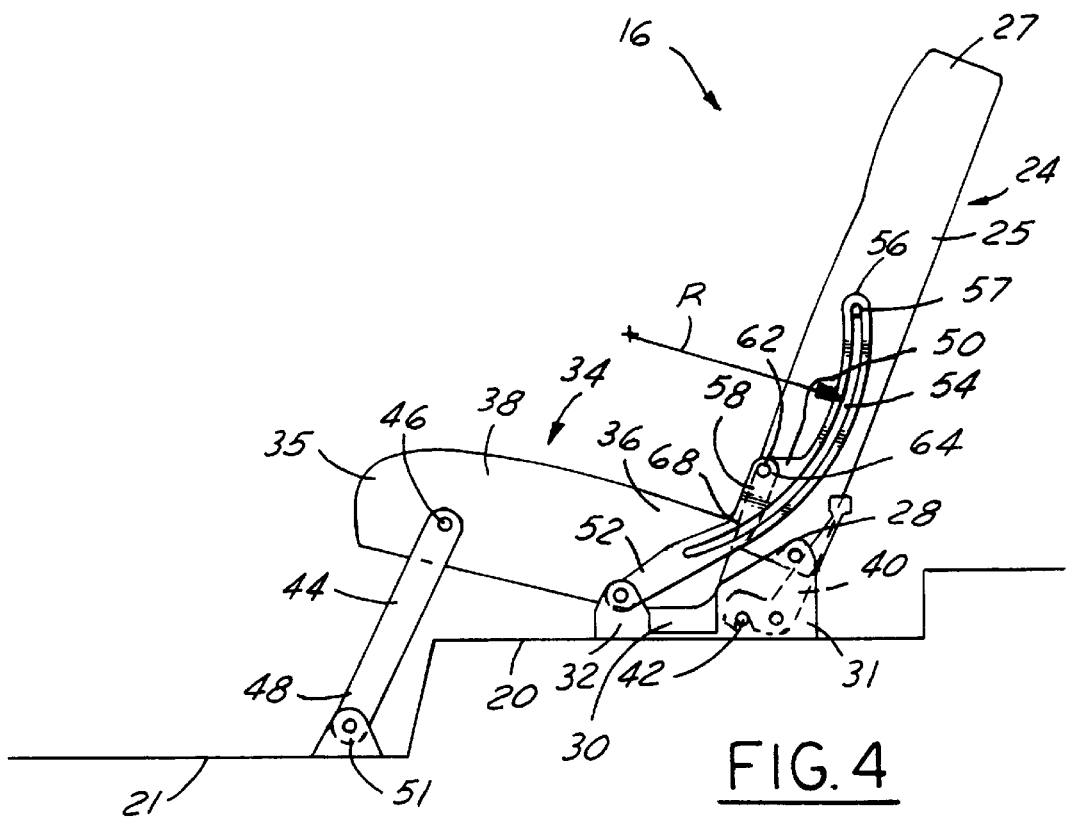

ND,934

FOLDING SEAT MOUNTING APPARATUS

BACKGROUND OF THE INVENTION

1. Field of the Invention

This invention relates generally to seat assemblies for use within motor vehicles and, more particularly, to foldable seat assemblies.

2. Disclosure Information

For various types of motor vehicles, it is often desirable to provide a movable seating arrangement in the rows behind the driver's seat to increase the cargo capacity of the vehicle. Due to suspension packaging constraints, a third row seating assembly is often mounted on an upper portion of a vehicle floor, while the forward seats are mounted on a lower portion of the vehicle floor. To create a level load floor, some third row foldable seats include mechanisms that move a portion of the seat forward and downward over the lower portion of the floor to create a flat load floor. However, these third row seats are often positioned forward near the forward edge of the upper portion of the floor to allow this motion. This placement generally compromises the available leg room between the second and third row seats to an unacceptable level. The only known alternative is to provide removable third row seats, which is undesirable due to their bulk and weight.

It would therefore be desirable to provide a foldable seat assembly which could significantly increase the forward displacement of the seat bottom cushion in moving the seating assembly from the upright seating position to the folded position.

SUMMARY OF THE INVENTION

According to the present invention, a seat mounting apparatus has been discovered for supporting a seat on a floor of a motor vehicle and allowing the seat to be positioned from an upright seating position to a folded position. The seat mounting apparatus includes a seat back frame having an upper end and a lower end pivotally attached to the floor; a seat bottom frame having a forward end and a rearward end disposed adjacent to the seat back frame when the seat is in the upright seating position; a first leg having a first end pivotally connected to the seat bottom frame and having a second end pivotally connected to the floor; a first slotted link having a third end pivotally connected to the floor and a slot extending from a position substantially adjacent to the third end to a fourth end opposite the third end, the slot being slidably engaged with a slider pin disposed on the seat back frame; and a first rear link having a fifth end rigidly attached to the seat bottom frame and a sixth end pivotally attached to an intermediate pivot point on the first slotted link, the intermediate pivot point being disposed intermediate of the third and fourth ends of the first slotted link. Upon movement of the seat back frame from the upright position to the folded position, the first slotted link together with the first rear link position the seat bottom frame forward and downward such that the seat back frame lies substantially flat and parallel to the floor.

It is an advantage of the present invention to increase significantly the forward displacement of the seat bottom cushion in moving the seating assembly from the upright seating position to the folded position.

BRIEF DESCRIPTION OF THE DRAWINGS

FIG. 4 is a side view of a passenger seat placed in an upright seating position in accordance with the present invention.

FIG. 5 side view of a passenger seat moving from upright seating position to a folded position in accordance with the present invention.

DETAILED DESCRIPTION OF THE PREFERRED EMBODIMENT

Figure 1:
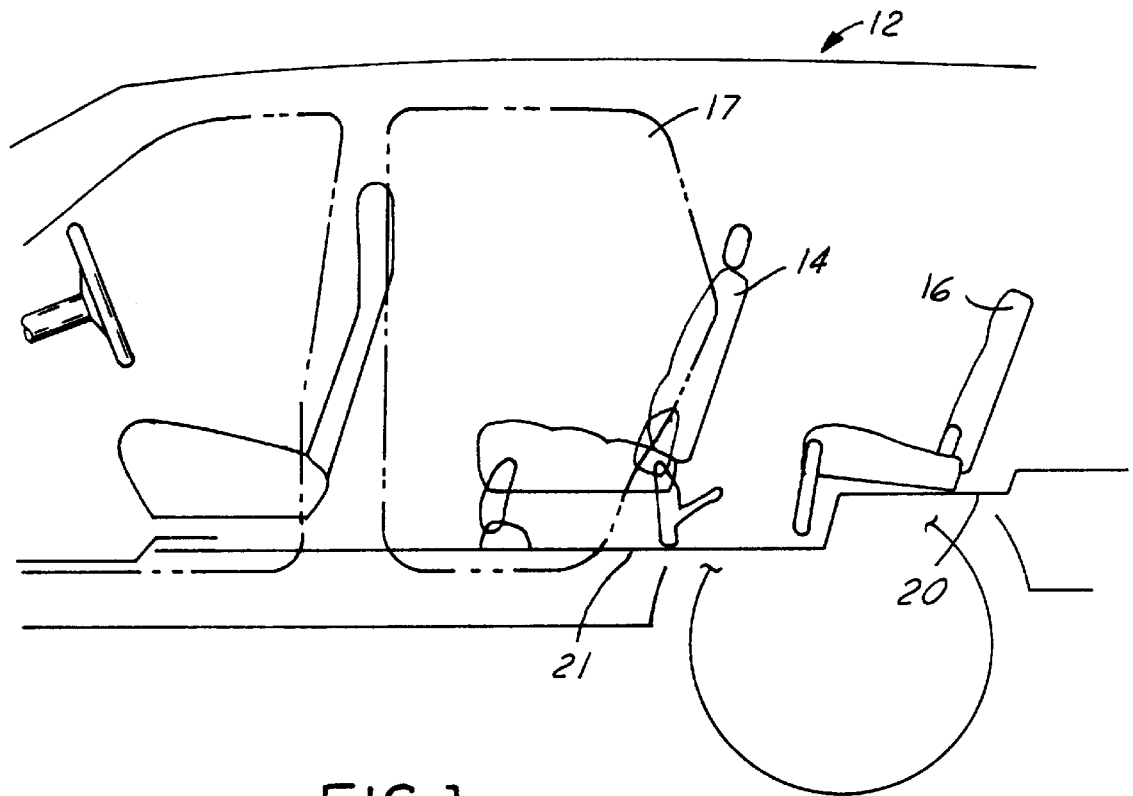
FIG. 1 is a side view of a seating arrangement within a motor vehicle with all seats in the upright seating position in accordance with the present invention.
Figure 2:
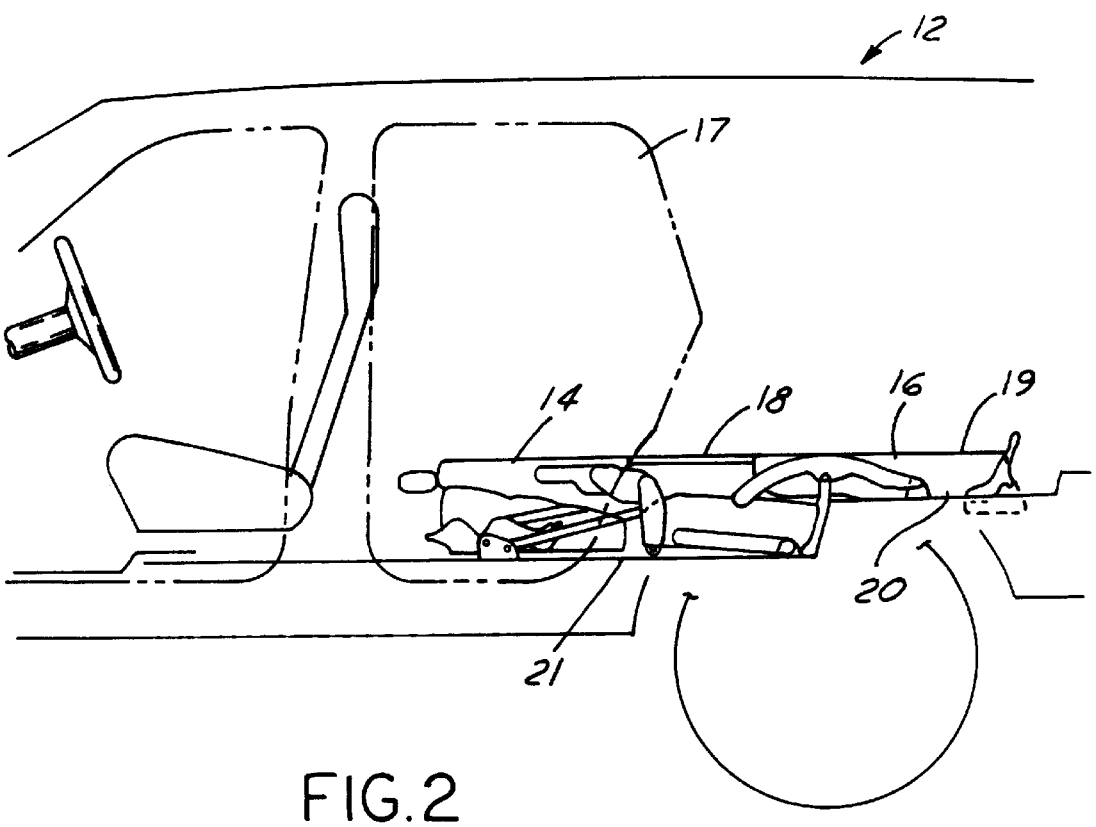
FIG. 2 is a side view of a seating arrangement within a motor vehicle with the third row seat in the dropped and folded position in accordance with the present invention.

Referring now to FIGS. 1 and 2, a three-row seating arrangement of a motor vehicle 12 is shown. Typically, passengers enter and exit the second row seats 14 and third row seats 16 through a second entrance 17. When it is desired to provide maximum cargo capability for the vehicle, the present invention allows the third row seat 16 to drop and fold from an upright seating position to a folded position such that the third row seat 16 rests above both a lower floor 21 and an upper floor 20. The third row seat 16 combines with the second row seat 14 to provide a substantially flat load floor 19. A gap filler 18 may be provided to complete the load floor 19 between the second row seat 14 and third row seat 16.

Figure 6:
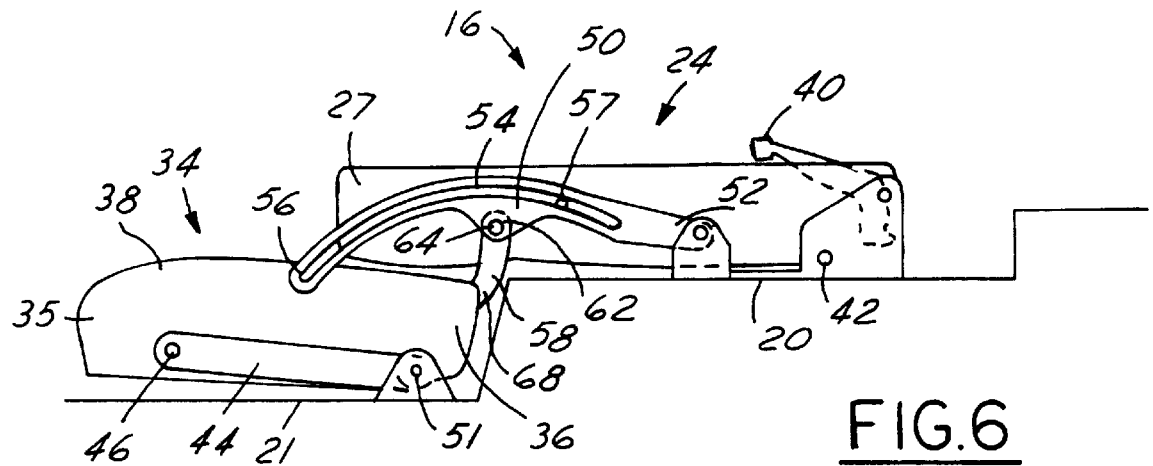
FIG. 6 is a side view of a passenger seat placed in a folded position in accordance with the present invention.

Referring now to FIGS. 4–6, a left side view of the third row seat 16 is shown and will now be described. To simplify the description of the third row seat 16, only one side will be described, it being understood that both sides, unless otherwise mentioned, are symmetrically opposite. Furthermore, some of the components such as releases may be shown on one or both sides, however, this is a matter of design choice, with any combination being considered within the scope of the present invention. In addition, while the preferred embodiment discloses a third row seat as an example of the present invention, it should be understood that the present invention can be incorporated into any row within the motor vehicle.

Figure 3:
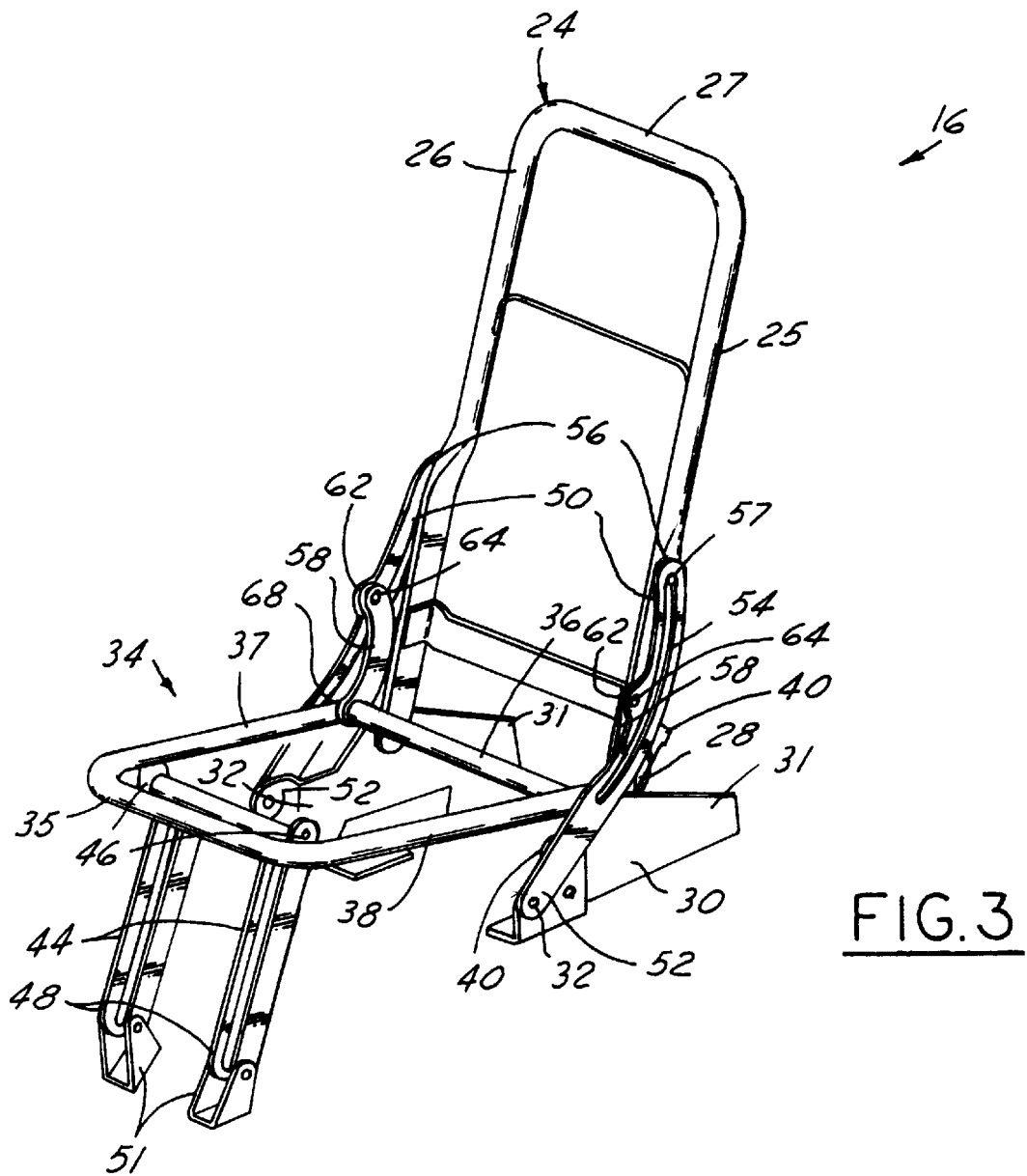
FIG. 3 is a perspective view of a seat mechanism constructed in accordance with the present invention.

The third row seat 16 includes a seat back frame 24 and a seat bottom frame 34 enclosed in cushions for comfort. For clarity, the frames are shown in FIG. 3, with the frames being covered by the cushion in the remaining figures. Those skilled in the art should appreciate that while a tube frame has been described here, the operability and functionality of the present invention is not dependent on any specific frame construction. Many equivalents exist, such as stamped, cast metal, and molded structural reinforced plastics.

Referring now to FIG. 4–6, the seat back frame 24 includes a right back side 26 and a left back side 25 located opposite therefrom, an upper end 27 interconnecting the right and left back sides 26, 25, and a lower end 28 pivotally attached to a rearward end 31 of right and left upper floor mounting brackets 30 which are securely attached to the upper floor 20. Each of the upper floor mounting brackets 30 also includes a forward end 32. A release lever 40 is pivotally attached to the lower end 28 of the seat back frame 24 and engages a striker 42 mounted on the upper floor 20 to lock the seat back frame 24 in the upright position. Slider pins 57 are attached to the right and left back sides 26, 25, respectively, of the seat back frame 24.

The slider pins 57 slidably engage with slots 54 of slotted links 50. The slotted links 50 include third ends 52 pivotally connected to forward ends 32 of the upper floor mounting brackets 30 and fourth ends 56 opposite the third ends 52. Each of the slots 54, in the form of an arcuate slot with a radius of curvature R directed toward the forward end 35 of the seat bottom frame 34, extends from a position substantially adjacent to the third end 52 to the fourth end 56. Intermediate pivot points 64 of the slotted links 50 are positioned intermediate of the third ends 52 and the fourth ends 56.

Sixth ends 62 of rear links 58 pivotally attach to the intermediate pivot points 64 on the slotted links 50. The rear links 58 extend downwardly and include a fifth ends 68 rigidly attached to right and left bottom sides 37, 38, respectively, of the seat bottom frame 34.

The seat bottom frame 34 is positioned adjacent to the seat back frame 24 with the third row seat 16 in the upright seating position. The seat bottom frame 34 includes the forward end 35 and a rearward end 36 positioned opposite therefrom, with the right and left bottom sides 37, 38 interconnecting the forward and rearward ends 35, 36.

First and second front legs 44 support the forward end 35 of the seat bottom frame 34 above the lower floor 21. The front legs 44 includes first ends 46 pivotally connected to the right and left bottom sides 37, 38, respectively, of the seat bottom frame 34 and second ends 48 pivotally attached to lower floor mounting brackets 51.

Referring now to FIGS. 4–6, operation of the present invention will now be described. To rotate the seat from an upright seating position, as shown in FIG. 4, to a folded position, as shown in FIG. 6, the operator rotates the release lever 40 to disengage the release lever 40 from the striker 42, allowing the seat back frame 24 to unlock from the upright position. Next, the operator applies a force in the forward and downward direction on the seat back frame 24, rotating the seat back frame 24 counterclockwise and causing the slider pin 57 to slide along the slot 54 in the downward direction. In addition, the seat bottom frame 34 rotates counterclockwise about the second end 48 of the front leg 44 and the rear link 58 pivots counterclockwise about the sixth end 62 attached to the intermediate pivot point 64 on the slotted link 50. The rear link 58, combined with the slot 54 of the slotted link 50, allows the rearward end 36 of the seat bottom frame 34 to move forward over the upper floor 20 before dropping downward to the lower floor 21. In the folded position, the seat back frame 24 and seat bottom frame 34 lie substantially flat and parallel to the upper and lower floors 20, 21, respectively.

The foregoing description presents a preferred embodiment of the present invention. Details of construction have been shown and described for purposes of illustration rather than limitation. For example, it should be recognized to those skilled in the art that a spring-assist device could easily be incorporated into the design so as to urge the third row seat 16 from the folded position to the upright seating position, thus reducing the manual effort required in rotating the seat. Other modifications and alterations of the invention will no doubt occur to those skilled in the art that will come within the scope and spirit of the following claims.

We claim:

1. A seat mounting apparatus for supporting a seat on a floor of a motor vehicle and allowing the seat to be positioned from an upright seating position to a folded position, said seat mounting apparatus comprising:

a seat back frame having an upper end and a lower end for pivotal attachment to the floor;

a seat bottom frame having a forward end and a rearward end disposed adjacent to said seat back frame when said seat is in the upright seating position;

a first leg having a first end pivotally connected to said seat bottom frame and having a second end for pivotal connection to the floor;

a pivotable first slotted link having a third end for pivotal connection to the floor and a slot extending from a position substantially adjacent to said third end to a fourth end opposite said third end, said slot being slidably engaged with a slider pin disposed on said seat back frame; and a first rear link having a fifth end rigidly attached to said seat bottom frame and a sixth end pivotally attached to an intermediate pivot point on said first slotted link, said intermediate pivot point being disposed intermediate of said third and fourth ends of said first slotted link;

whereby upon movement of said seat back frame from the upright position to the folded position, said first slotted link together with said first rear link operatively position said seat bottom frame forward and downward such that said seat back frame lies substantially flat and parallel to the floor.

2. The seat mounting apparatus according to claim 1, wherein said slot in said first slotted link is in the form of an arcuate slot with a radius of curvature directed toward the forward end of said seat bottom frame.

3. The seat mounting apparatus according to claim 1, further comprises:

a second leg, each of said first and second legs having a first end pivotally connected to said seat bottom frame and having a second end for pivotal connection to the floor;

a second slotted link, said first and second slotted links each having a third end for pivotal connection to the floor and a slot extending from a position substantially adjacent to said third end to a fourth end opposite said third end, said slot being slidably engaged with a slider pin disposed on said seat back frame; and a second rear link, said first and second rear links each having a fifth end rigidly attached to said seat bottom frame and a sixth end pivotally attached to intermediate pivot points on each said first and second slotted links, said intermediate pivot points being disposed intermediate of said third and fourth ends of said first and second slotted links.

4. The seat mounting apparatus according to claim 1, further comprises:

a release lever pivotally attached to said lower end of said seat back frame and being adapted to selectively engage a striker mounted on the floor to lock said seat back frame in the upright position.

5. A seat mounting apparatus for supporting a seat on a floor of a motor vehicle and allowing the seat to be positioned from an upright seating position to a folded position, said seat mounting apparatus comprising:

a seat back frame having an upper end and a lower end for pivotal attachment to the floor;

a seat bottom frame having a forward end and a rearward end disposed adjacent to said seat back frame when said seat is in the upright seating position;

first and second legs each having a first end pivotally connected to said seat bottom frame and each having a second end for pivotable connection to the floor;

first and second pivotable slotted links each having a third end for pivotal connection to the floor and a slot extending from a position substantially adjacent to said third end to a fourth end opposite said third end, said slot being slidably engaged with a slider pin disposed on said seat back frame; and first and second rear links each having a fifth end rigidly attached to said seat bottom frame and a sixth end pivotally attached to an intermediate pivot point on each of said first and second slotted links, said intermediate pivot point being disposed intermediate of said third and fourth ends of said first and second slotted links;

whereby upon movement of said seat back frame from the upright position to the folded position, said first and second slotted links together with said first and second rear links operatively position said seat bottom frame forward and downward such that said seat back frame lies substantially flat and parallel to the floor.

6. The seat mounting apparatus according to claim 5, wherein said slot in each of said first and second slotted links is in the form of an arcuate slot with a radius of curvature directed toward the forward end of said seat bottom frame.

7. The seat mounting apparatus according to claim 5, further comprises:

a release lever pivotally attached to said lower end of said seat back frame and being adapted to selectively engage a striker mounted on the floor to lock said seat back frame in the upright position.

8. A seat mounting apparatus for supporting a seat on a floor of a motor vehicle and allowing the seat to be positioned from an upright seating position to a folded position, said seat mounting apparatus comprising:

a seat back frame having an upper end, right and left back sides and a lower end for pivotal attachment to the floor;

a seat bottom frame having a forward end, right and left bottom sides and a rearward end disposed adjacent to said seat back frame when said seat is in the upright seating position;

first and second front legs each having a first end pivotally connected to said right and left bottom sides of said seat bottom frame, respectively, and each having a second end for pivotal connection to the floor;

first and second pivotable slotted links each having a third end for pivotal connection to the floor between said lower end of said seat back frame and said first and second front legs, each of said first and second slotted links having a slot extending from a position substantially adjacent to said third end to a fourth end of each of said first, and second slotted links, first and second slider pins fixedly disposed on said right and left back sides of said seat back frame, respectively, between said upper end and said lower end of said seat back frame, said first and second slider pins being slidably engaged in said slot of said first and second slotted links; and first and second rear links each having a fifth end rigidly attached to said right and left bottom sides, respectively, of said seat bottom frame adjacent to said rearward end and a sixth end pivotally attached to an intermediate pivot point on each of said first and second slotted links, said intermediate pivot point being disposed intermediate of said third and fourth ends of said first and second slotted links;

whereby upon movement of said seat back frame from the upright position to the folded position, said first and second slotted links together with said first and second rear links operatively position said seat bottom frame forward and downward such that said seat back frame lies substantially flat and parallel to the floor.

9. The seat mounting apparatus according to claim 8, further comprises:

a release lever pivotally attached to said lower end of said seat back frame and being adapted to selectively engage a striker mounted on the floor to lock said seat back frame in the upright position.

10. The seat mounting apparatus according to claim 8, wherein said slot in each of said first and second slotted links is in the form of an arcuate slot with a radius of curvature directed toward the forward end of said seat bottom frame.

* * * * *